(12) United States Patent
Washbourne et al.

(10) Patent No.: US 9,075,159 B2
(45) Date of Patent: *Jul. 7, 2015

(54) SYSTEM AND METHOD FOR SEISMIC DATA INVERSION

(75) Inventors: John Kenneth Washbourne, Walnut Creek, CA (US); Nikhil Koolesh Shah, Stanmore (GB); Kenneth Paul Bube, Seattle, WA (US)

(73) Assignee: Chevron U.S.A., Inc., San Ramon, CA (US)

( * ) Notice: Subject to any disclaimer, the term of this patent is extended or adjusted under 35 U.S.C. 154(b) by 877 days.

This patent is subject to a terminal disclaimer.

(21) Appl. No.: 13/156,190

(22) Filed: Jun. 8, 2011

(65) Prior Publication Data

US 2012/0314538 A1    Dec. 13, 2012

(51) Int. Cl.
*G01V 1/28*    (2006.01)
*G01V 1/30*    (2006.01)

(52) U.S. Cl.
CPC .............. *G01V 1/30* (2013.01); *G01V 2210/45* (2013.01)

(58) Field of Classification Search
CPC ........... G01V 1/28; G01V 1/30; G01V 1/282; G01V 2210/20; G01V 2210/21; G01V 2210/32; G01V 2210/40; G01V 2210/42; G01V 2210/45; G01V 2210/322; G01V 2210/3246; G06F 19/00; G06G 7/48; G03H 3/00
USPC ............ 73/625–626; 367/7, 9, 11, 43–49, 73, 367/130, 138, 15; 600/437–482; 702/17; 703/10, 6
See application file for complete search history.

(56) References Cited

U.S. PATENT DOCUMENTS

| 5,424,743 | A | | 6/1995 | Ghiglia et al. |
| 5,583,825 | A | * | 12/1996 | Carrazzone et al. ............ 367/31 |
| 5,774,089 | A | * | 6/1998 | Bamler et al. .............. 342/25 C |
| 6,594,585 | B1 | | 7/2003 | Gersztenkorn |
| 6,643,590 | B2 | | 11/2003 | Wiggins |
| 6,654,694 | B2 | * | 11/2003 | Fokkema et al. ............... 702/18 |

(Continued)

FOREIGN PATENT DOCUMENTS

| WO | 2010-019314 A1 | 1/2010 |
| WO | 2010019314 | 2/2010 |

OTHER PUBLICATIONS

Gens, (Non Patent Literature (NPL), Phase Unwrapping (GEOS 639—InSAR and its applications, Fall 2006).*

(Continued)

*Primary Examiner* — Isam Alsomiri
*Assistant Examiner* — Amienatta M Ndure Jobe
(74) *Attorney, Agent, or Firm* — Marie L. Clapp

(57) ABSTRACT

A system and computer-implemented method for determining properties of a subsurface region of interest from seismic data include obtaining seismic data and an initial earth property model, forward modeling using the initial earth property model to create modeled seismic data, transforming the modeled and actual seismic data to create frequency domain modeled and actual seismic data including amplitude portion and phase portions, measuring the misfit between the frequency domain modeled and actual seismic data to produce frequency domain residual seismic data, performing phase unwrapping of certain observed frequency components of the frequency domain residual seismic data to create an unwrapped residual phase portion, and inverting the unwrapped residual phase portion to determine desired properties of the subsurface region of interest.

16 Claims, 12 Drawing Sheets

(56) References Cited

U.S. PATENT DOCUMENTS

| | | | |
|---|---|---|---|
| 6,999,880 B2 | 2/2006 | Lee | |
| 7,373,252 B2 | 5/2008 | Sherrill et al. | |
| 7,376,539 B2 | 5/2008 | Lecomte | |
| 7,675,818 B2* | 3/2010 | Liu et al. | 367/73 |
| 7,797,110 B2 | 9/2010 | Shin | |
| 7,974,824 B2* | 7/2011 | Song | 703/10 |
| 8,553,497 B2* | 10/2013 | Krohn | 367/45 |
| 2003/0036872 A1* | 2/2003 | Stark | 702/123 |
| 2003/0151976 A1 | 8/2003 | Leaney | |
| 2004/0122325 A1 | 6/2004 | Chambers et al. | |
| 2006/0256657 A1* | 11/2006 | Robinson | 367/38 |
| 2007/0063877 A1* | 3/2007 | Shmunk et al. | 341/50 |
| 2007/0203673 A1* | 8/2007 | Sherrill et al. | 702/189 |
| 2007/0282535 A1* | 12/2007 | Sirgue et al. | 702/14 |
| 2009/0006054 A1* | 1/2009 | Song | 703/6 |
| 2009/0010104 A1* | 1/2009 | Leaney | 367/47 |
| 2009/0292475 A1 | 11/2009 | Alam et al. | |
| 2010/0042391 A1* | 2/2010 | Shin | 703/6 |
| 2010/0110830 A1 | 5/2010 | Thomson | |
| 2010/0142316 A1* | 6/2010 | Keers et al. | 367/15 |
| 2010/0149917 A1* | 6/2010 | Imhof et al. | 367/53 |
| 2010/0270026 A1 | 10/2010 | Lazaratos et al. | |
| 2010/0322032 A1* | 12/2010 | Shin | 367/43 |
| 2011/0007604 A1* | 1/2011 | Liu et al. | 367/52 |
| 2011/0090760 A1 | 4/2011 | Rickett et al. | |
| 2011/0110189 A1* | 5/2011 | Riyanti et al. | 367/24 |
| 2011/0134718 A1* | 6/2011 | van Borselen et al. | 367/24 |
| 2012/0016592 A1* | 1/2012 | Artman et al. | 702/16 |
| 2012/0039149 A1* | 2/2012 | van Borselen et al. | 367/24 |
| 2012/0109612 A1* | 5/2012 | Krebs et al. | 703/10 |
| 2012/0314538 A1* | 12/2012 | Washbourne et al. | 367/49 |
| 2013/0135965 A1* | 5/2013 | Ji et al. | 367/21 |
| 2013/0343153 A1* | 12/2013 | Laws | 367/21 |

OTHER PUBLICATIONS

Fichtner, et al. (Non Patent Literature (NPL), Full seismic waveform inversion for structural and source parameters; Inaugural-Dissertation; 2009).*

Kenneth P. Bube and Robert T. Langan, A continuation approach to regularization of ill-posed problems with application to crosswell-traveltime tomography, 2008, Geophysics, vol. 73, No. 5.

Kenneth P. Bube and Robert T. Langan ,On a continuation approach to regularization for crosswell tomography, 1999, SEG Expanded Abstracts 18, 1295-1298.

John K. Washbourne, James W. Rector, and Kenneth P. Bube, Crosswell traveltime tomography in three dimensions, 2002, Geophysics, vol. 67, No. 3.

Min Shin, Waveform inversion using a logarithmic wavefield, Jun. 2006, p. R31, col. 2, p. R36, col. 1.

* cited by examiner

SYSTEM AND METHOD FOR SEISMIC DATA INVERSION

FIELD OF THE INVENTION

The present invention relates generally to methods and systems for inverting seismic data to compute physical properties of the earth's subsurface, and in particular methods and systems for performing phase-only full waveform inversion to compute velocity models from seismic data.

BACKGROUND OF THE INVENTION

Subsurface exploration, and in particular exploration for hydrocarbon reservoirs, typically uses methods such as migration of seismic data to produce interpretable images of the earth's subsurface. In areas where the subsurface is complex due to faulting, salt bodies and the like, traditional migration methods often fail to produce adequate images. Additionally, traditional migration methods require a reasonably accurate velocity model of the subsurface; such velocity models may also be determined from the seismic data but may be very expensive in both expertise and computational cost.

There are many conventional methods for computing velocity models from seismic data, including NMO velocity analysis, migration velocity analysis, tomography, and full waveform inversion. Some methods, such as full waveform inversion, are very computationally expensive and have only recently become practical as computing power has increased. Conventional full waveform inversion is done in the time domain or in a transform domain such as the temporal Fourier transform domain or the Laplace transform domain. These methods often fail due to the lack of low frequencies, typically less than 3 Hertz, in seismic data. As one skilled in the art will appreciate, a velocity model is a low frequency model so it is difficult to invert for it from the seismic data that lacks the low frequency information.

Traditional methods of determining velocity models and using them for migration to produce images of the earth's subsurface are expensive and fraught with difficulties, especially in complex areas. As the search for hydrocarbons moves to these complex areas, it is necessary to find better ways to process the seismic data and improve velocity models.

SUMMARY OF THE INVENTION

According to one implementation of the present invention, a computer-implemented method of determining properties of a subsurface region is disclosed. The method includes obtaining actual seismic data representative of the subsurface region and an initial earth property model for the subsurface region, performing forward modeling using the initial earth property model to create modeled seismic data with similar acquisition specifications as the actual seismic data, transforming the modeled and actual seismic data to a temporal Fourier frequency domain to create frequency domain modeled and actual seismic data wherein the frequency domain modeled and actual seismic data include an amplitude portion and a phase portion, measuring the misfit between the frequency domain modeled seismic data and frequency domain actual seismic data to produce frequency domain residual seismic data, performing phase unwrapping of the phase portion of certain observed frequency components of the frequency domain residual seismic data to create an unwrapped residual phase portion, and inverting the unwrapped residual phase portion to determine desired properties of the subsurface region of interest, wherein the inverting minimizes an objective function defined to measure the misfit.

The method may also include phase extrapolation. Additionally, the method may perform a second inverting step using the properties determined from the first inverting step as an initial model.

In another embodiment, a system for determining properties of a subsurface region is disclosed. The system includes a data source, a user interface, and a processor configured to execute computer modules designed to perform the method.

In another embodiment, an article of manufacture for determining properties of a subsurface region is disclosed. The article of manufacture includes a computer readable medium having a computer readable code embodied therein, the code being configured to execute the method.

The above summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other features of the present invention will become better understood with regard to the following description, pending claims and accompanying drawings where:

DETAILED DESCRIPTION OF THE INVENTION

Figure 1:
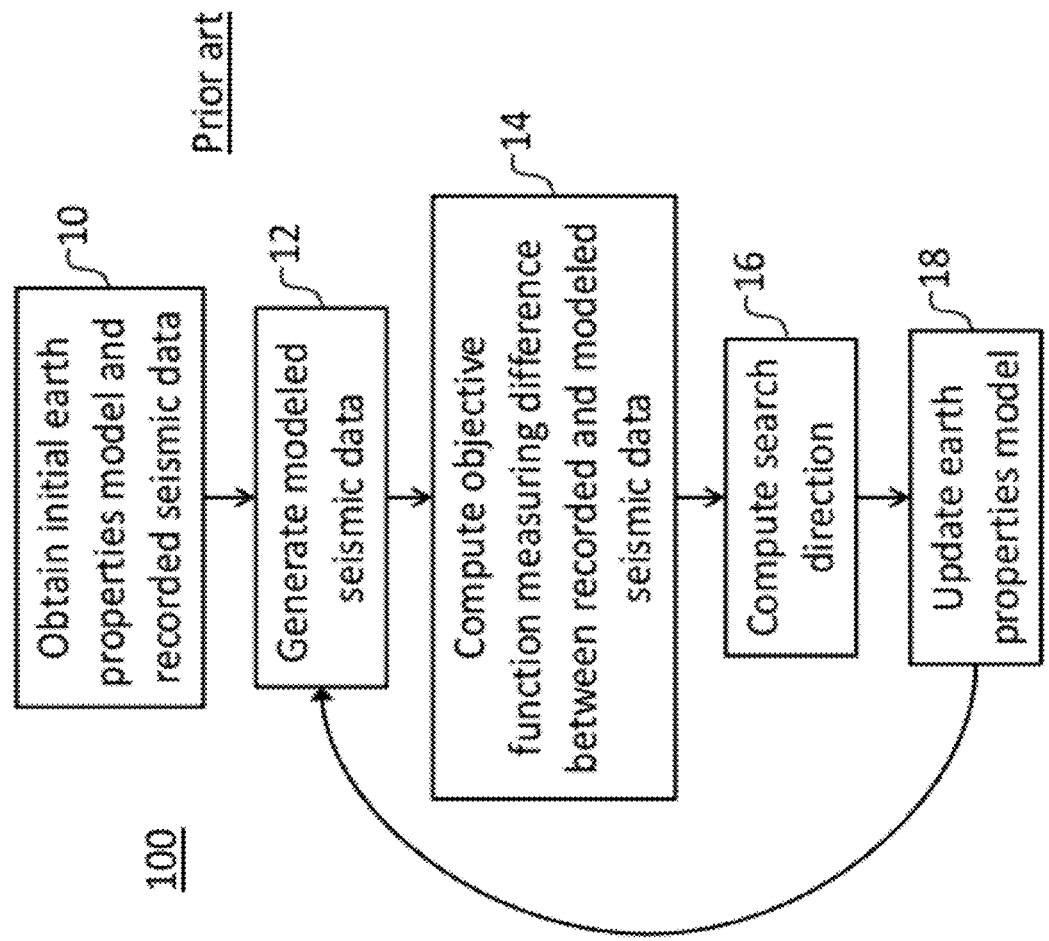
FIG. 1 is a flowchart illustrating a method of full waveform inversion.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multiple computer processors, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

The present invention relates to computing physical properties of the earth's subsurface and, by way of example and not limitation, can compute a velocity model using phase-only full waveform inversion.

To begin the explanation of the present invention, first consider the basic full waveform inversion method 100 illustrated in the flowchart of FIG. 1. At step 10, we obtain an initial model of earth properties, by way of example and not limitation, velocity. Full waveform inversion is a local optimization method and therefore depends strongly on where the optimization starts. For conventional full waveform inversion, there is a strict condition on the initial model in terms of what is required for the nonlinear evolution to converge to a true solution: the initial model must generate data that is within half a wave-cycle of the observed data at the lowest usable temporal frequency. It is important to note that with the conventional approach there is no easy way to determine if the initial model meets this condition, and the optimization can easily fail with a poor initial model.

In step 12, the initial model of earth properties is used by a seismic modeling engine to generate modeled seismic data. In general modeling can be performed in either the time domain or the frequency domain (temporal Fourier transform) with no penalty, depending on various factors like the size/extent of the modeling domain and the amount of memory available. Large 3D surveys typically require time-domain modeling because frequency domain modeling is extremely memory intensive for large numbers of model parameters. One significant advantage of frequency domain modeling is that one directly has access to both amplitude and phase, and this allows the use of "phase only" approaches that can be geared to be dominated by kinematics instead of amplitudes.

In step 14, we compute an objective function that will measure the misfit between the recorded seismic data and the modeled seismic data. The most widely used objective function for conventional full waveform inversion is simple least squares: the sum of the squares of the differences between the observed data and the modeled data for all sources, receivers and recorded time samples. However, this is not meant to be limiting; other objective functions can be used, including correlation, the L1 norm, and hybrid or long-tailed norms. The objective function may be constructed in the time domain or in a transform domain such as the frequency domain.

In the time domain, the least squares objective function may take the form:

$$E = \tfrac{1}{2} \Sigma_s \Sigma_r \Sigma_t [\psi_{obs}(t,r,s) - \psi_{mod}(t,r,s)]^2 \quad \text{Eqn. 1}$$

where E is the objective function, s are the sources, r are the receivers, t is time, is the recorded data, and $\psi_{mod}$ is the modeled data. This objective function suffers from the critical flaw that seismic data is bandlimited. Differencing of bandlimited signals introduces the possibility of "cycle skipping", where the wave shapes of the modeled and observed data are similar enough to cause a small difference, but are misaligned in an absolute sense by (at least) one wave cycle. This, together with the local nature of full waveform inversion, leads to the likely possibility that the nonlinear optimization will fail and converge to a local minima rather than the global solution.

One way to change the characteristics of the problem is to change the objective function. If we transform to the frequency domain we can consider objective functions at one or more frequency components individually (monochromatically). In the time domain, we cannot consider a single time sample because of dependence on earlier times. In the frequency domain, the response at different frequencies is uncoupled: the solution at one frequency does not depend on the solution at any other frequency. We can also, importantly, treat amplitude and phase differently. Taking the temporal Fourier transform of Eqn. 1, the objective function becomes:

$$E(\omega) = \tfrac{1}{2} \Sigma_{s} \Sigma_{r} | A_{obs}(\omega,r,s) e^{i\phi_{obs}(\omega,r,s)} - A_{mod}(\omega,r,s) e^{i\phi_{mod}} |^2 \quad \text{Eqn. 2}$$

where $A_{obs}(\omega,r,s)$ is the amplitude of the observed data at receiver r, from source s, at temporal frequency $\psi$, $\phi_{obs}(\omega,r,s)$ is the phase of the observed data, $A_{mod}(\omega,r,s)$ is the amplitude of the modeled data, and $\phi_{mod}(\omega,r,s)$ is the phase of the modeled data.

In the frequency domain, we can consider the phase portion independently of the amplitude portion. For the phase-only case of full waveform inversion, by way of example and not limitation, the least squares objective function becomes:

$$E(\omega) = \tfrac{1}{2} \Sigma_s \Sigma_r | \phi_{obs}(\omega,r,s) - \phi_{mod}(\omega,r,s) |^2 \quad \text{Eqn. 3}$$

The modeled data in Eqns. 1-3 may be generated in the time or the frequency domain. The objective functions of Eqns. 1-3 measure the mismatch between the observed and modeled data and are decreased at each iteration. The inversion may be done as a phase-only inversion in either the time or frequency domain, as long as the mismatch can be measured directly or indirectly in terms of the phase of one or more frequency components.

Once the objective function is computed in step 14 of FIG. 1, a search direction is computed in step 16. In order to update the earth properties model and reduce the misfit between the observed and modeled data, the gradient of the objective function is used to generate a search direction for improving the model. The earth properties model is then iteratively perturbed along successive search directions until some satisfaction criteria are reached.

The calculation of the search direction becomes more clear if we treat the modeled data as the action of a nonlinear seismic modeling operator on the earth property model. Using the example of velocity (v) as the earth property, the operator being nonlinear means that a linear change in velocity does not necessarily result in a linear change in the modeled data.

Using the symbol N to represent the nonlinear seismic modeling operator that maps velocity models into seismic data, and the action of this operator on the current velocity model as N(v), we can rewrite Eqn. 1:

$$E = \frac{1}{2} \Sigma_s \Sigma_r \Sigma_t [\psi_{obs}(t,r,s) - N(v)]^2 \qquad \text{Eqn. 4}$$

so the derivative with respect to velocity becomes:

$$\frac{\partial}{\partial v} E = -\sum_s \sum_r \sum_t \left( [\psi_{obs}(t,r,s) - N(v)] \frac{\partial}{\partial v} N(v) \right). \qquad \text{Eqn. 5}$$

Eqn. 5 shows that the derivatives used to update the earth property model depend very importantly on the modeling operator, the derivatives of the modeling operator with respect to velocity, and the current seismic data residual.

The nonlinear problem of full waveform inversion is solved by successive linearization. For the example of inverting for velocity, at iteration k, this is done by linearizing around the velocity $v_k$, and seeking an update to the velocity $\delta v$, such that the updated model is: $v_{k+1} = v_k + \delta v$. We need the linearization in order to compute the search direction. Given the general linear least squares system:

$$E = \|y - Ax\|^2 \qquad \text{Eqn. 6}$$

The gradient or search direction can be written:

$$\frac{\partial}{\partial x} E = A^\dagger [y - Ax]. \qquad \text{Eqn. 7}$$

Where $A^\dagger$ is the adjoint (conjugate transpose) of the linear operator A. For our nonlinear problem of full waveform inversion, we have the nonlinear operator N, and we need the adjoint of the linearized operator in order to compute a gradient. We use L for the linearized operator, and $L^\dagger$ for the adjoint of the linearized operator. The operator L maps a vector of velocity perturbations into a vector of wavefield perturbations, and the adjoint operator $L^\dagger$ maps a vector of wavefield perturbations into a vector of velocity perturbations (Eqn. 8).

$$L \delta v_1 = \delta \psi_1$$

$$L^\dagger \delta \psi_2 = \delta v_2 \qquad \text{Eqn. 8}$$

Once the search direction is computed, we need to determine how large a step to take in that direction, which is how the earth properties model is updated in step 18 of FIG. 1. At least two alternatives exist: a nonlinear line search, or solving the linear problem using, by way of example and not limitation, a Gauss-Newton methodology.

The majority of published conventional approaches employ steepest descent or preconditioned steepest descent for nonlinear optimization. Once the search direction is estimated, these approaches forget about the current linear problem and use a nonlinear line search to estimate the best "step size" to take in the search direction. If we use by for the search direction (usually the gradient of the objective function with respect to the velocity parameters), and a for the step size, we can express the nonlinear line search as:

$$\min_\alpha \{ 1; 2 \Sigma_s \Sigma_r \Sigma_t [\psi_{obs}(t,r,s) - N(v + \alpha \delta v)]^2 \} \qquad \text{Eqn. 9}$$

One serious shortcoming of a nonlinear line search is taking such a large step that the modeled data becomes cycle skipped with respect to the observed data. This could result in a smaller residual and lead to convergence to a local minimum rather than the true global solution.

An alternative to using a nonlinear line search is to solve the linear problem at each successive linearization of the nonlinear evolution. Solving the linear problem obviates the need for a line search as the step size selection is implicit in the machinery of linear optimization, as in for example the conjugate gradient method. Solving the linear problem requires accurate machinery of the linearization: forward and adjoint linearized operators that pass the adjoint test. This often requires significant work, but can result in significant improvements in convergence. Using the linearized operators L and $L^\dagger$ described above, we can solve the linear system using, by way of example and not limitation, conjugate gradient on the normal equations. The linear system we want to solve is:

$$\min \| L \delta v - \delta \psi \|^2 \qquad \text{Eqn. 10}$$

where $\delta \psi$ is the current residual $\delta \psi = \psi_{obs} - N(v_k)$.

After the earth property model has been updated, the process loops back to step 12 where the updated model is used to generate modeled seismic data. Step 14 is performed and, if the difference between the modeled seismic data and the recorded seismic data is large, steps 16 and 18 are also performed and looped back to step 12, until the difference at step 14 is sufficiently small or the number of loops or iterations reaches a predefined number.

When attempting a conventional full waveform inversion, method 100 of FIG. 1 has serious limitations. First, full waveform inversion is a local optimization method, which means it is sensitive to where the nonlinear evolution starts. If the initial model is far from the true model, local approaches fail. This problem impacts all local methods, including Newton and quasi-Newton methods. For conventional full waveform inversion, it is absolutely critical to obtain a good starting model. In general, there are no obvious ways to determine quantitatively if a given starting model will converge to the true global minimum.

Another serious limitation of conventional full waveform inversion is the bandwidth limitation. There is a direct relationship between the temporal bandwidth of data used to generate a gradient (search direction) and the spatial bandwidth of the gradient obtained by evaluation of Eqn. 5. Low temporal frequencies in the data produce long spatial wavelengths in the gradient. Consider FIG. 2, which demonstrates this by plotting gradients in spatial X and Z coordinates computed at four frequencies. Note that at the lowest frequency of 0.5 Hz (panel 20) the calculated gradient is much more spatially smooth. At 1 Hz (panel 21), 1.5 Hz (panel 22), and 2 Hz (panel 23), the gradient becomes progressively less smooth. The bandwidth of seismic data is limited, and if correct long spatial wavelengths of velocity do not exist in the initial model, conventional full waveform cannot recover them and in general will fail and converge to a local minimum rather than the true global solution. This directly implies we should invert seismic data at the lowest usable frequency, in order to employ gradients that modify the long spatial wavelengths of velocity. However, the lowest usable frequency is seismic data is often not low enough to recover the longest spatial wavelengths and leads to a global minimum—this is a key limiting factor of the prior art which the present invention addresses.

Figure 3:
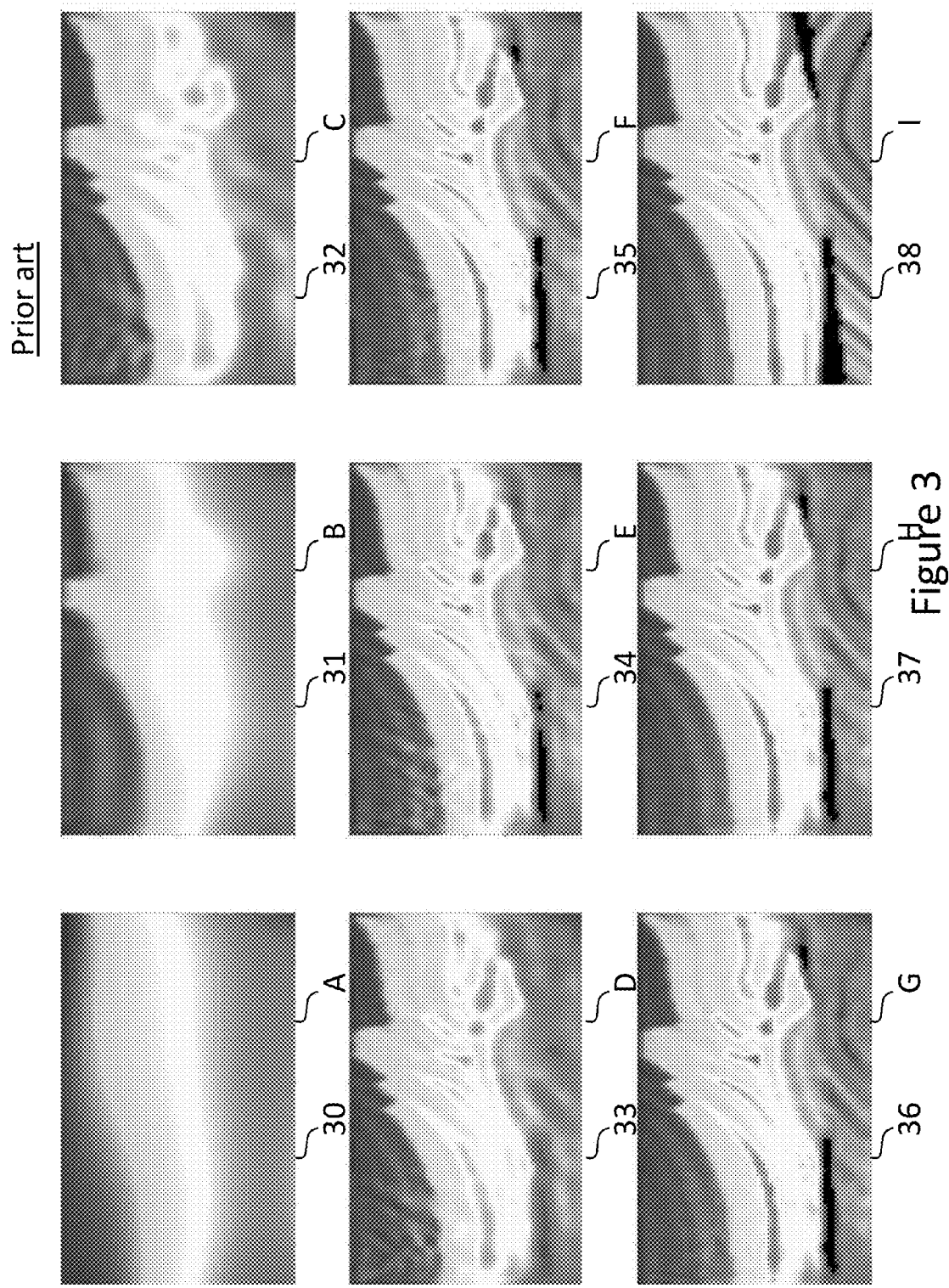
FIGS. 3A-3I illustrate a conventional full waveform inversion process beginning from a good initial earth properties model.
Figure 4:
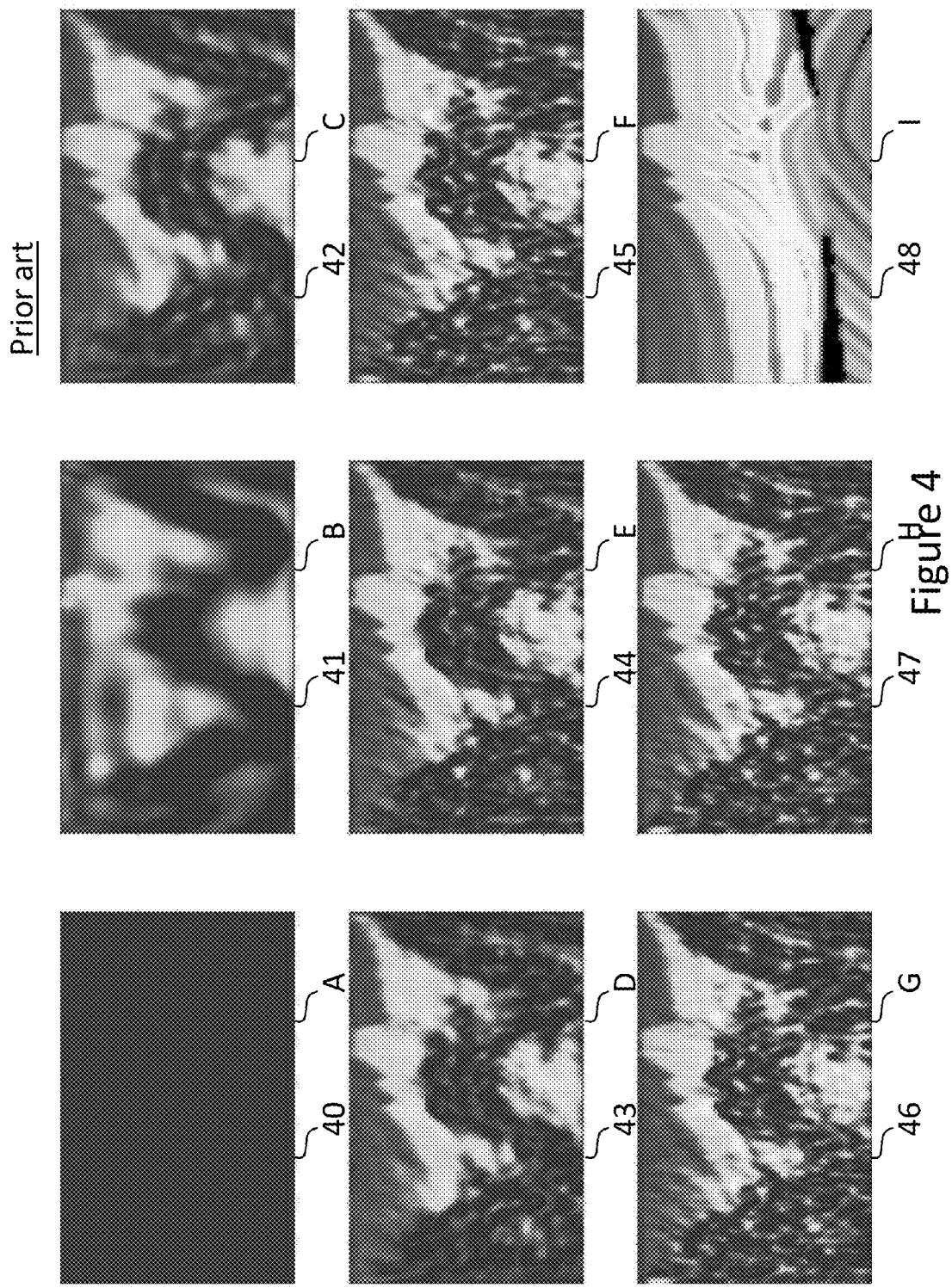
FIGS. 4A-4I illustrate a conventional full waveform inversion process beginning from a poor initial earth properties model.

Examples of the importance of the initial earth properties model for a conventional full waveform inversion can be seen in FIGS. 3 and 4. In FIG. 3, the initial velocity model can be seen in panel 30. It is a smoothed version of the true velocity model which is in panel 38. Panels 31-37 show the result of conventional full waveform inversion at 8 successive frequencies: 1, 3, 5, 7, 9, 11, and 13 Hz. The final result in panel 37 is quite accurate when compared with the true velocity model in panel 38.

In FIG. 4, the initial velocity model in panel 40 is constant and is set to be water velocity. This is far from the true velocity model in panel 48. Panels 41-47 show the result of conventional full waveform inversion at 8 successive frequencies: 1, 3, 5, 7, 9, 11, and 13 Hz. While the uppermost part of the model is accurately recovered, the deeper parts have converged to a local minimum that is very far from the true solution. We can conclude from FIGS. 3 and 4 that conventional full waveform inversion must have a good initial earth properties model to converge to the correct solution.

Figure 2:
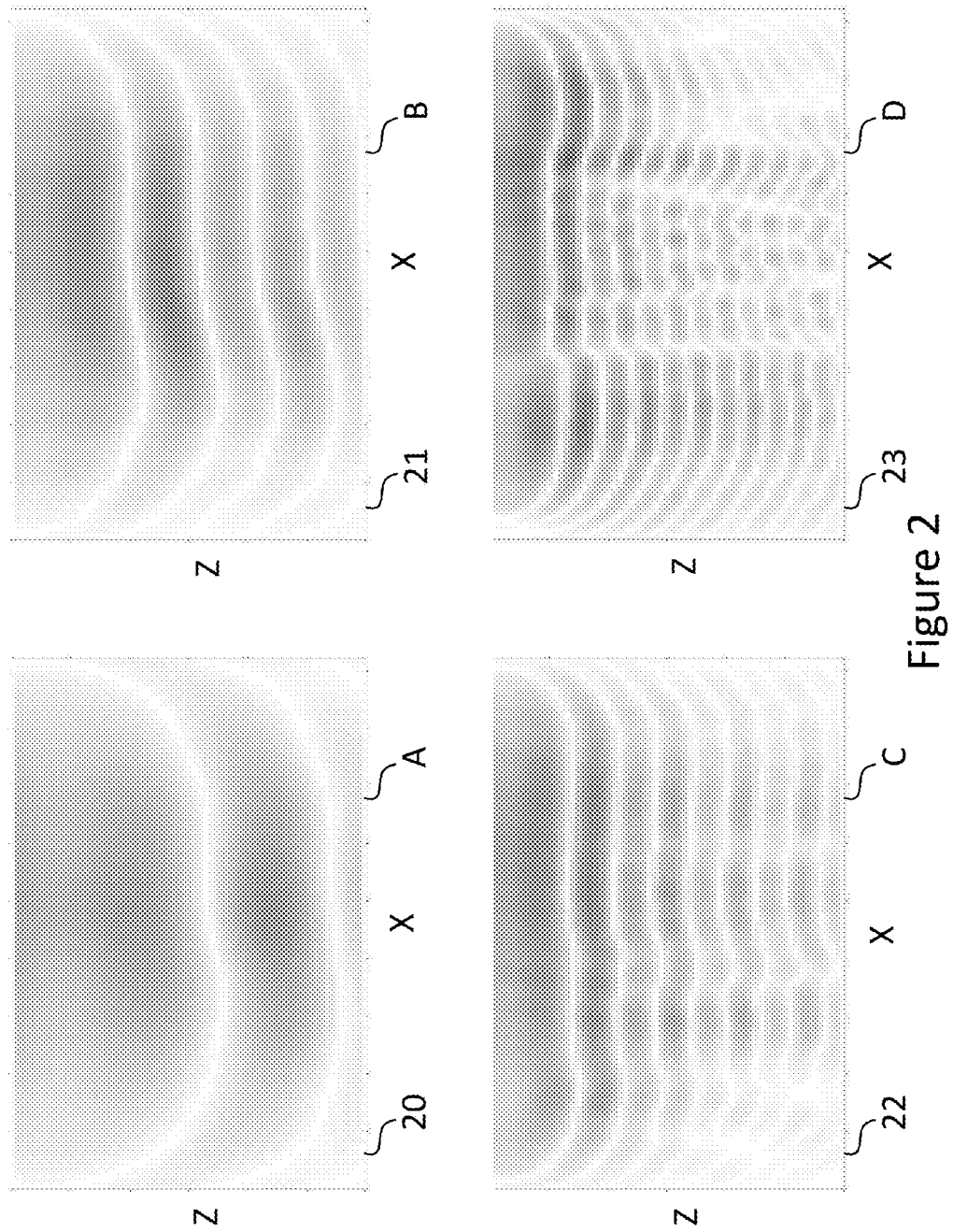
FIGS. 2A-2D illustrates gradient bandwidths at various frequencies.

Based on method 100 of FIG. 1, the bandwidth of gradients of FIG. 2, and the initial model requirements of the conventional full waveform inversion demonstrated in FIGS. 3 and 4, the inventors have determined that a new method for full waveform inversion is needed. The present invention overcomes the bandwidth and initial model limitations of the conventional method.

Figure 5:
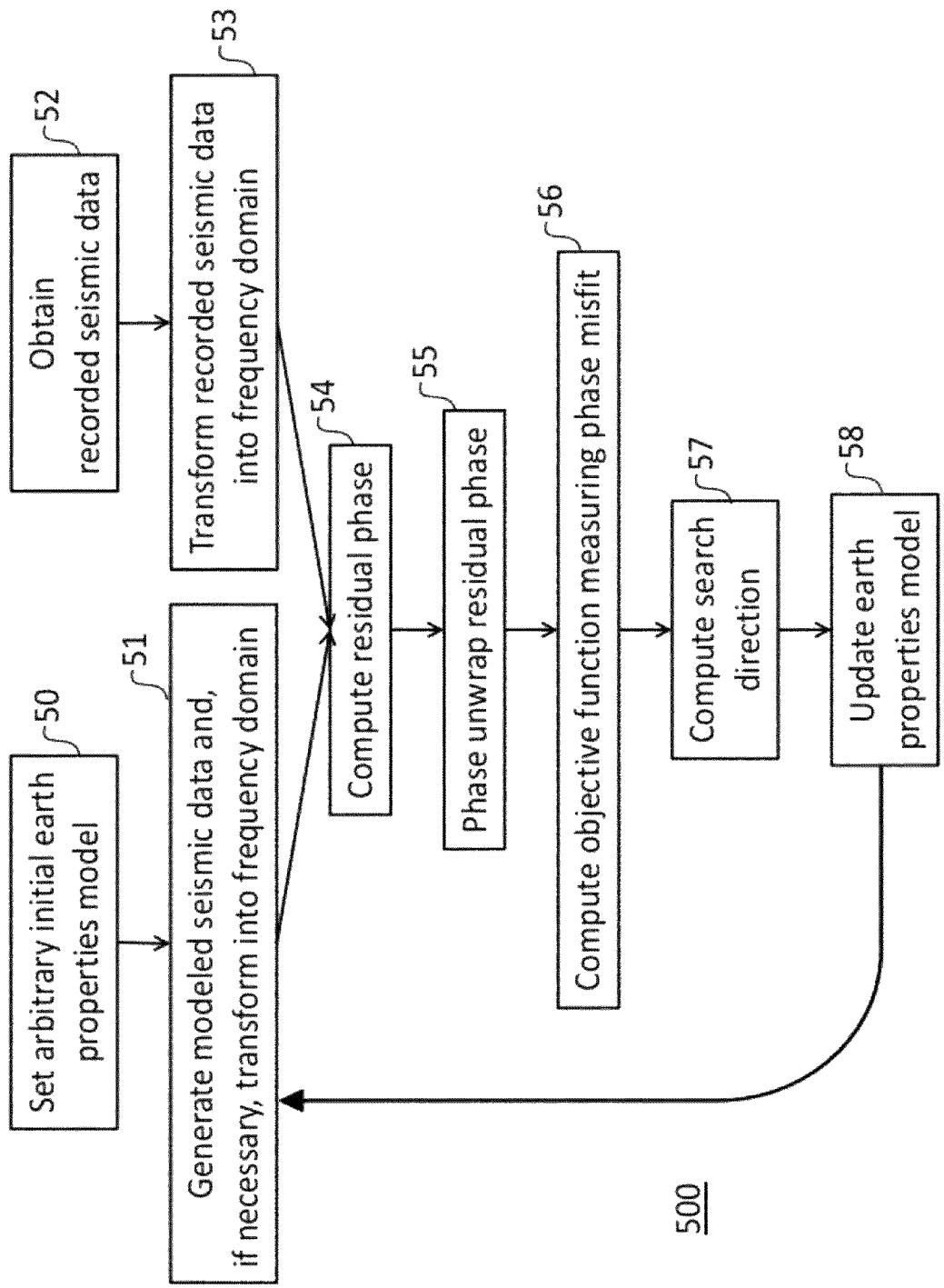
FIG. 5 is a flowchart illustrating a method in accordance with an embodiment of the invention.

An embodiment of the present invention is described by method 500 in FIG. 5. Many of the steps of method 500 are similar to the steps of method 100 in FIG. 1 but method 500 does not suffer from the limitations of the conventional full waveform inversion. To begin, at step 50, the present invention sets an arbitrary initial earth model such as, by way of example and not limitation, setting the entire initial model to be water velocity of 1500 m/s. This initial model is used to generate modeled seismic data at step 51. The forward modeling of the modeled seismic data may be done in the time domain or in the frequency domain by any of the many known forward modeling algorithms, such as finite difference modeling. If the forward modeling is done in the time domain, it may then be transformed to the frequency domain. In step 52, recorded seismic data is obtained and in step 53 it is transformed into the frequency domain. When both the modeled seismic data and the recorded seismic data are in the frequency domain, a residual phase may be computed at step 54, which is the difference between the phase portions of the modeled and recorded seismic data. At step 55, the residual phase is phase unwrapped. It is also possible to unwrap the phase of the modeled seismic data and the recorded seismic data separately. The unwrapped phases may then be used to compute an unwrapped residual phase.

Phase unwrapping ensures that all appropriate multiples of $2\pi$ have been included in the phase portion of the data, meaning that the phase is continuous rather than jumping by $2\pi$. There are methods for phase unwrapping but many fail for even moderate frequencies such as those greater than 2 Hz. Due to this, the inventors have developed a new method for phase unwrapping to prepare frequency domain data for inversion. The new method uses a particular type of left preconditioning that de-weights the influence of large phase jumps. Either the observed phase and modeled phase may be unwrapped individually or their difference, the residual phase, may be unwrapped. The latter is preferred since the phase differences between adjacent data points will be smaller.

The procedure we use for phase unwrapping is inspired by a fundamental theorem of vector calculus, also called the Helmholtz Decomposition. The Helmholtz Decomposition can be used to decompose a vector field into a curl-free component and a divergence-free component. We are interested in the curl-free component only, so we do not require a precise Helmholtz decomposition. The curl-free component is the gradient of a scalar potential, and is a conservative field. A conservative field is a vector field for which line integrals between arbitrary points are path independent. We identify unwrapped residual phase with the scalar potential whose gradient is the conservative field of a Helmholtz decomposition.

We start by taking the gradient of the input wrapped phase, and adjusting by adding or subtracting $2\pi$ so that the result lies in the range $[-\pi,+\pi]$. This "adjusted phase" is also known as the "principal value" of the phase. Here "gradient" means the numerical derivative along the directions of source and receiver, respectively. We can write the projection of the adjusted gradient of phase onto a conservative field as follows:

$$\nabla \phi_{res} = g \qquad \text{Eqn. 11}$$

where $\phi_{res}$ is the unwrapped residual phase and g is the adjusted gradient of the wrapped phase, as explained above.

To calculate unwrapped phase, we discretize the gradient operator with respect to source and receiver coordinates and solve the overdetermined system shown in Eqn. 12 by least squares. In one embodiment, we find that a sparse QR factorization is a particularly effective method for solving this system of equations.

$$\min \|\nabla \phi_{res} - g\|^2 \qquad \text{Eqn. 12}$$

This approach of projection onto a conservative field for phase unwrapping has difficulty at moderate frequencies much greater than 1 Hz. For $n_s$ sources and $n_r$ receivers, the system of equation 12 will have $n_s*n_r$ rows for the adjusted gradient with respect to source coordinates, and $n_s*n_r$ rows for the adjusted gradient with respect to receiver coordinates. It is therefore twice overdetermined.

We found that failures of the system are related to large magnitudes of the entries of the adjusted gradient, and by weighting these large magnitude entries down, which has the effect of de-emphasizing their importance in the system of equations, we can significantly improve robustness. In an embodiment, the application of a diagonal left preconditioner whose entries are inversely proportional to the magnitude of the adjusted gradient greatly improves the performance of phase unwrapping at higher frequencies. Other types of preconditioners may also be used and fall within the scope of the present invention.

The new system is shown in equation 13, where the $k^{th}$ element of the left preconditioner W is inversely proportional to the magnitude of the components of the $k^{th}$ element of the adjusted gradient raised to the power $\alpha$.

$$\min \|W[\nabla \phi_{res} - g]\|^2$$

$$W_{k,s} = |g_{k,s}|^{-\alpha}$$

$$W_{k,r} = |g_{k,r}|^{-\alpha} \qquad \text{Eqn. 13}$$

Figure 6:
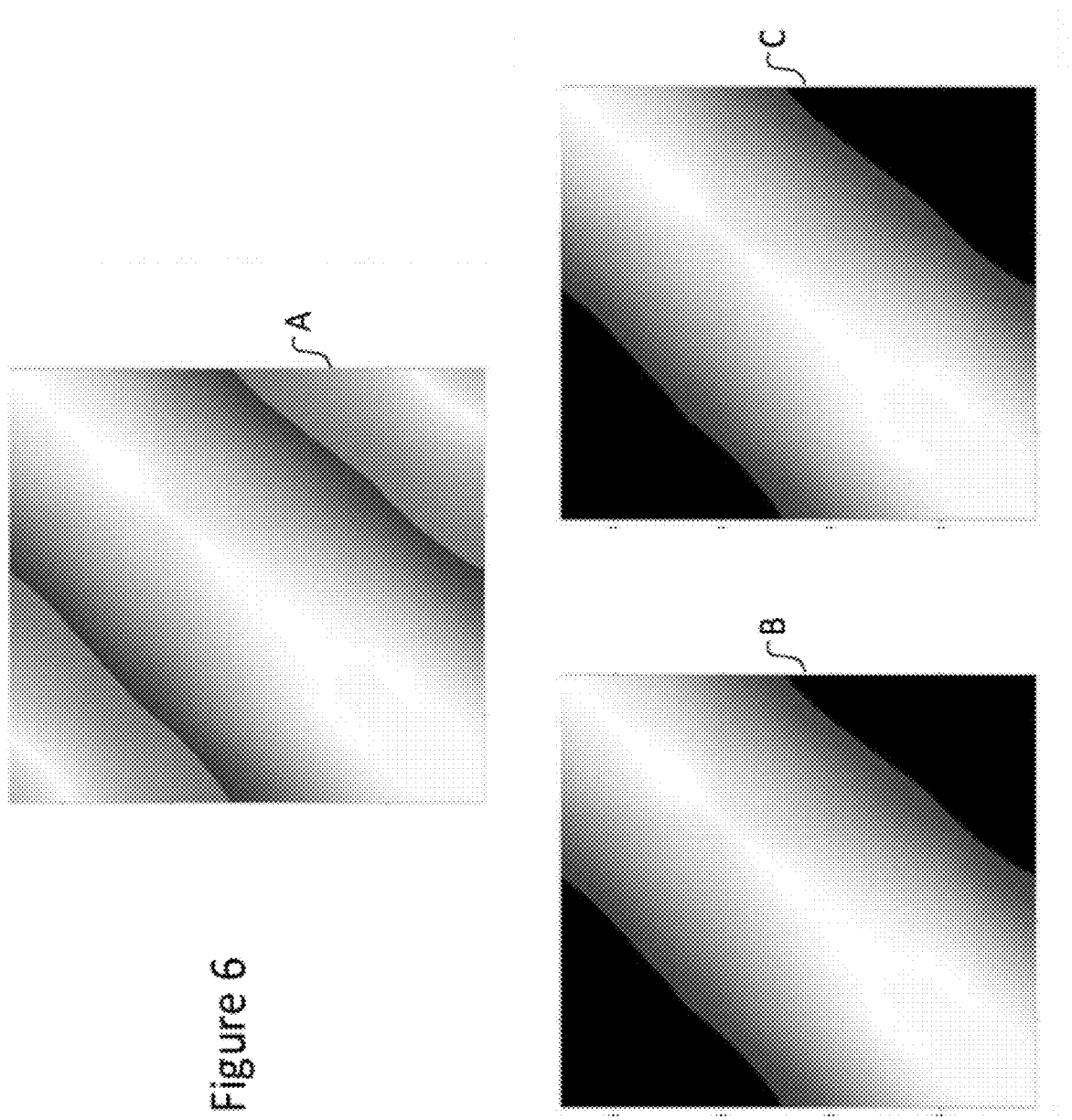
FIGS. 6A-6C illustrate a method of phase unwrapping with and without a preconditioner at a very low frequency.

In one embodiment, this user-defined positive power $\alpha$ may be set to 2.5. Using this embodiment, examples of phase unwrapping with and without the preconditioner can be seen for data at 0.5 Hz in FIG. 6 and at 1.5 Hz in FIG. 7. Both FIG.

Figure 7:
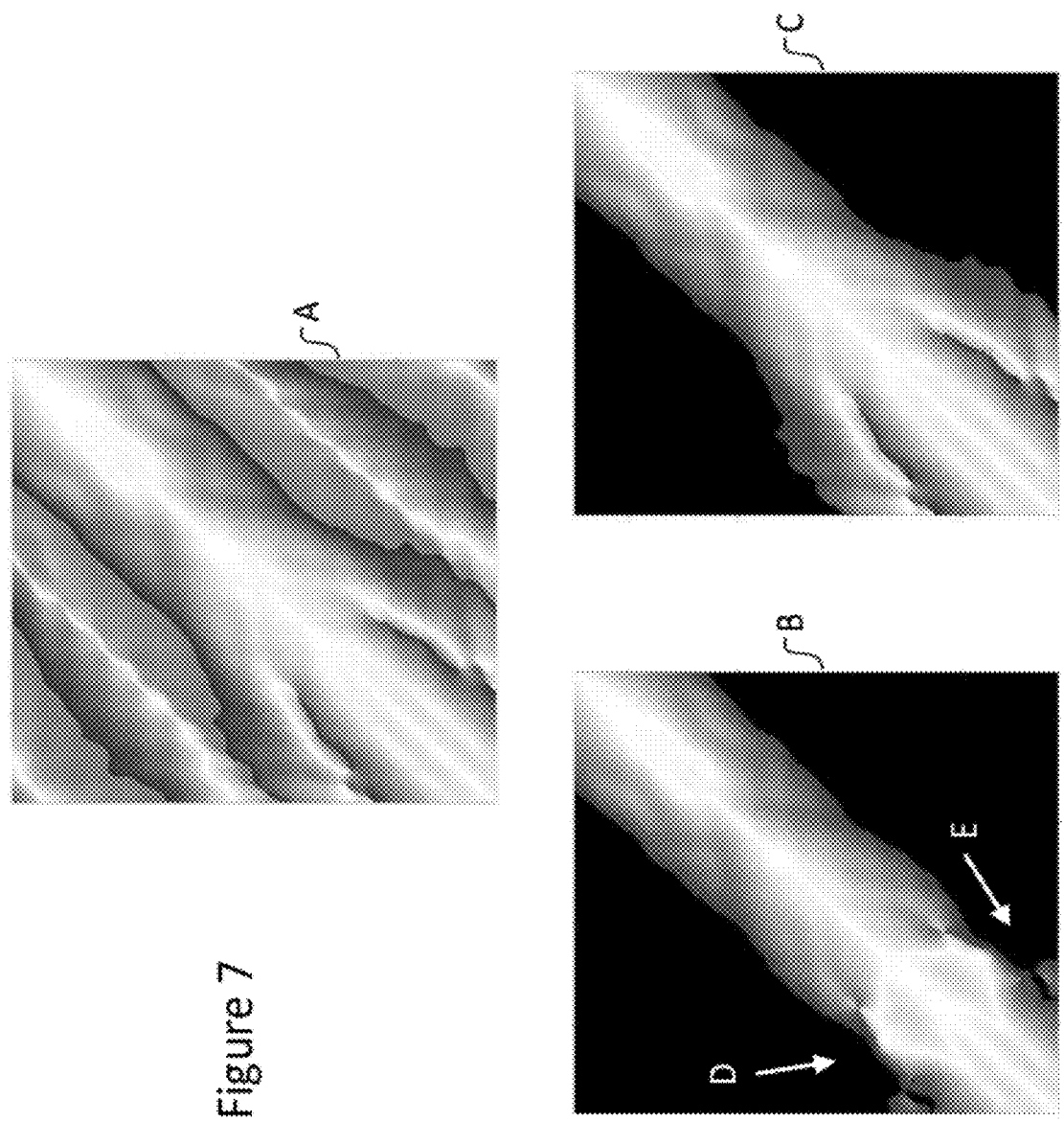
FIGS. 7A-7C illustrate a method of phase unwrapping with and without a preconditioner at a moderately low frequency.

6 and FIG. 7 show the wrapped phase in panel A, the unwrapped phase without use of a preconditioner in panel B, and the unwrapped phase with a left diagonal preconditioner in panel C. In the low frequency case in FIG. 6, there is little difference in the results of unwrapping with and without the preconditioner. In FIG. 7, however, the result without the preconditioner has erroneously changed the phase in the areas indicated by D and E, indicating that as the frequency gets higher, the preconditioning is necessary to obtain a good result.

We note that this phase unwrapping approach does not require integration or the specification of boundary conditions in order to obtain unwrapped phase from the principal value of the gradient of wrapped phase.

In another embodiment, phase unwrapping may be used in a nonlinear line search where the search direction for velocity update has been pre-determined. There are at least two alternatives. In one alternative, a conventional objective function is used, but data whose residual phase magnitude exceeds π is excluded. This implies that the line search is only sensitive to data that is not cycle skipped. In another alternative, the objective function for the nonlinear line search is replaced with the least squares sum of the unwrapped residual phase. This means that the line search will correctly handle cycle skipped data. This results in an objective function very similar to that shown in equation 3, but with unwrapped residual phase ($\phi_{res}$) as shown in equation 14. We further note that unwrapped residual phase could be used as an objective function for stochastic or Bayesian inversion in order to correctly handle cycle skipped data.

$$E(\omega) = \frac{1}{2} \Sigma_s \Sigma_r \phi_{res}(\omega, r, s)^2 \quad \text{Eqn. 14}$$

Although the present method of phase unwrapping with a preconditioner has been explained in terms of preparing seismic data for inversion, this is not meant to be limiting. One skilled in the art will appreciate that unwrapped seismic data may be useful in other processing flows such as horizon flattening, homomorphic deconvolution, refraction statics, and residual alignment; and that other types of data, such as synthetic aperture radar, could benefit from this method of phase unwrapping with a preconditioner.

Referring again to FIG. 5, once the unwrapped residual phase is available, step 55 computes an objective function measuring the misfit between the phases of the recorded data and the modeled seismic data, in an embodiment, this objective function might be Eqn. 3. In this case, we perform phase-only full waveform inversion. To do so, we compute a search direction in step 56, update the earth property model in step 58, and iterate over steps 51, 54, 55, 56, 57 and 58 until the objective function is sufficiently small or a predetermine number of iterations has been reach.

In an embodiment, as we iterate through the phase-only full waveform inversion, we can improve our ability to recover long spatial wavelengths, such as those for velocity, by using a continuation approach to regularize successive iterations and constrain them to low wavenumber updates. The continuation approach is application of homotopy to smoothing regularization for nonlinear optimization. Homotopy here means starting with large magnitude for smoothing regularization and gradually decreasing the magnitude of the smoothing regularization over the course of the nonlinear evolution.

Smoothing regularization can implemented by adding rows to the linear system to penalize roughness in the model that is optimized. There are numerous other ways to implement roughness penalties. In one embodiment, the continuation approach may use analytic derivatives of polynomials representing slowness. A change of basis to smooth functions, for example radial basis functions, also works. Other possibilities include but are not limited to the spatial Fourier basis with a right preconditioner that scales with wavenumber, and $1^{st}$ or 2 numerical derivatives, either centered or not. In yet another embodiment, roughness penalties may be applied by application of $1^{st}$ forward numerical differences to pixelized models. These examples are not meant to be limiting; one skilled in the art will appreciate that there are many more possible regularization operators that may be used in the context of the continuation approach which fall within the scope of the present invention.

Expanding on the idea of smoothing regularization by the use of derivative penalties using $1^{st}$ order numerical differences, let us begin with a simple 3×3 pixelized velocity model. In two-dimensional space, the 9 velocities ($v_{x,z}$) would appear as:

TABLE 1

| 3 × 3 velocity model | | |
|---|---|---|
| $v_{1,1}$ | $v_{2,1}$ | $v_{3,1}$ |
| $v_{1,2}$ | $v_{2,2}$ | $v_{3,2}$ |
| $v_{1,3}$ | $v_{2,3}$ | $v_{3,3}$ |

Writing this velocity model as a column vector, we get:

$$\begin{pmatrix} v_{1,1} \\ v_{1,2} \\ v_{1,3} \\ v_{2,1} \\ v_{2,2} \\ v_{2,3} \\ v_{3,1} \\ v_{3,2} \\ v_{3,3} \end{pmatrix}$$

We can apply horizontal derivative penalties (a roughness penalty in the X direction) by penalizing the difference of adjacent velocities. e.g. ($v_{1,1} - v_{1,2}$). Note that the formal forward numerical derivative is written $$\frac{\partial}{\partial x} f(x) = \frac{f(x + \Delta) - f(x)}{\Delta},$$

but we can clear the denominator. This results in the matrix of horizontal derivative penalties shown:

$$\begin{pmatrix} +1 & 0 & 0 & -1 & 0 & 0 & 0 & 0 & 0 \\ 0 & +1 & 0 & 0 & -1 & 0 & 0 & 0 & 0 \\ 0 & 0 & +1 & 0 & 0 & -1 & 0 & 0 & 0 \\ 0 & 0 & 0 & +1 & 0 & 0 & -1 & 0 & 0 \\ 0 & 0 & 0 & 0 & +1 & 0 & 0 & -1 & 0 \\ 0 & 0 & 0 & 0 & 0 & +1 & 0 & 0 & -1 \end{pmatrix} \begin{pmatrix} v_{1,1} \\ v_{1,2} \\ v_{1,3} \\ v_{2,1} \\ v_{2,2} \\ v_{2,3} \\ v_{3,1} \\ v_{3,2} \\ v_{3,3} \end{pmatrix} = \begin{pmatrix} 0 \\ 0 \\ 0 \\ 0 \\ 0 \\ 0 \end{pmatrix}$$

and a similarly constructed matrix of vertical derivative penalties:

$$\begin{pmatrix} +1 & -1 & 0 & 0 & 0 & 0 & 0 & 0 & 0 \\ 0 & +1 & -1 & 0 & 0 & 0 & 0 & 0 & 0 \\ 0 & 0 & 0 & +1 & -1 & 0 & 0 & 0 & 0 \\ 0 & 0 & 0 & 0 & +1 & -1 & 0 & 0 & 0 \\ 0 & 0 & 0 & 0 & 0 & 0 & +1 & -1 & 0 \\ 0 & 0 & 0 & 0 & 0 & 0 & 0 & +1 & -1 \end{pmatrix} \begin{pmatrix} v_{1,1} \\ v_{1,2} \\ v_{1,3} \\ v_{2,1} \\ v_{2,2} \\ v_{2,3} \\ v_{3,1} \\ v_{3,2} \\ v_{3,3} \end{pmatrix} = \begin{pmatrix} 0 \\ 0 \\ 0 \\ 0 \\ 0 \\ 0 \end{pmatrix}$$

Note there are fewer rows than columns because the derivatives only involve horizontally or vertically adjacent pixels.

These horizontal and vertical derivative matrices can also be written as:

$$\lambda_x D_x v = 0$$

$$\lambda_z D_z v = 0 \qquad \text{Eqn. 15}$$

where v is the column vector of velocities, $D_x$ is the matrix of horizontal derivatives, $D_z$ is the matrix of vertical derivatives, and $\lambda_x$ and $\lambda_z$ are Lagrange multipliers.

The continuation approach starts with the Lagrange multipliers $\lambda_x$ and $\lambda_z$ large, and therefore initial solutions in the first "continuation step" are very smooth. Clearly this can aid in recovering the long spatial wavelengths of velocity. As the nonlinear evolution proceeds, we take additional continuation steps and the magnitudes of $\lambda_x$ and $\lambda_z$ are decreased. As the magnitude of the penalties is decreased, successively shorter spatial wavelengths are allowed in the velocity model.

There are many possible options for setting the initial $\lambda_x$ and $\lambda_z$ values. If chosen sufficiently large, only very long spatial wavelengths are allowed in the model, and the nonlinear evolution effectively becomes independent of the initial model. If chosen too small, the problem will not be regularized enough and independence from the starting model is lost. One embodiment for the initial values of these parameters is to normalize them by the operator norm of the linearized operator at each successive linearization. If, at the beginning of the nonlinear problem in the first linearization, we have the linear system Ax=y, we set $\lambda_x$ and $\lambda_z$ to be scaled by the operator norm $\|A\|$. $\|A\|$ can be obtained, for example, using the power method.

The phase-only full waveform inversion performed in the present invention may also include more accurately solving the linear problems at each iteration. If, at each successive linearization, we solve the Gauss-Newton problem to obtain the model update, rather than employ the combination of steepest descent and a line search, we get an improved result.

For the nonlinear problem of full waveform inversion, we linearize around the velocity at iteration k ($v_k$), and seek to obtain an update to the velocity $\delta v$ such that the updated model is: $v_{(k+1)} = v_{(k)} + \delta v$. This is successive linearization. The application of derivative penalties to the linear problem implies that we want the update to the model to be smooth, as shown here:

$$\lambda_x D_x \delta v = 0$$

$$\lambda_z D_z \delta v = 0 \qquad \text{Eqn. 16}$$

A more desirable approach is to regularize the nonlinear problem. This implies we want the updated model to be smooth:

$$\lambda_x D_x (v_k + \delta v) = 0$$

$$\lambda_z D_z (v_k + \delta v) = 0 \qquad \text{Eqn. 17}$$

This requires a non-zero right hand side, but the right hand side is easily obtained by application of the derivative operators $D_x$ and $D_z$ to the current velocity:

$$\lambda_x D_x \delta v = -\lambda_x D_x v_k$$

$$\lambda_z D_z \delta v = -\lambda_z D_z v_k \qquad \text{Eqn. 18}$$

Figure 8:
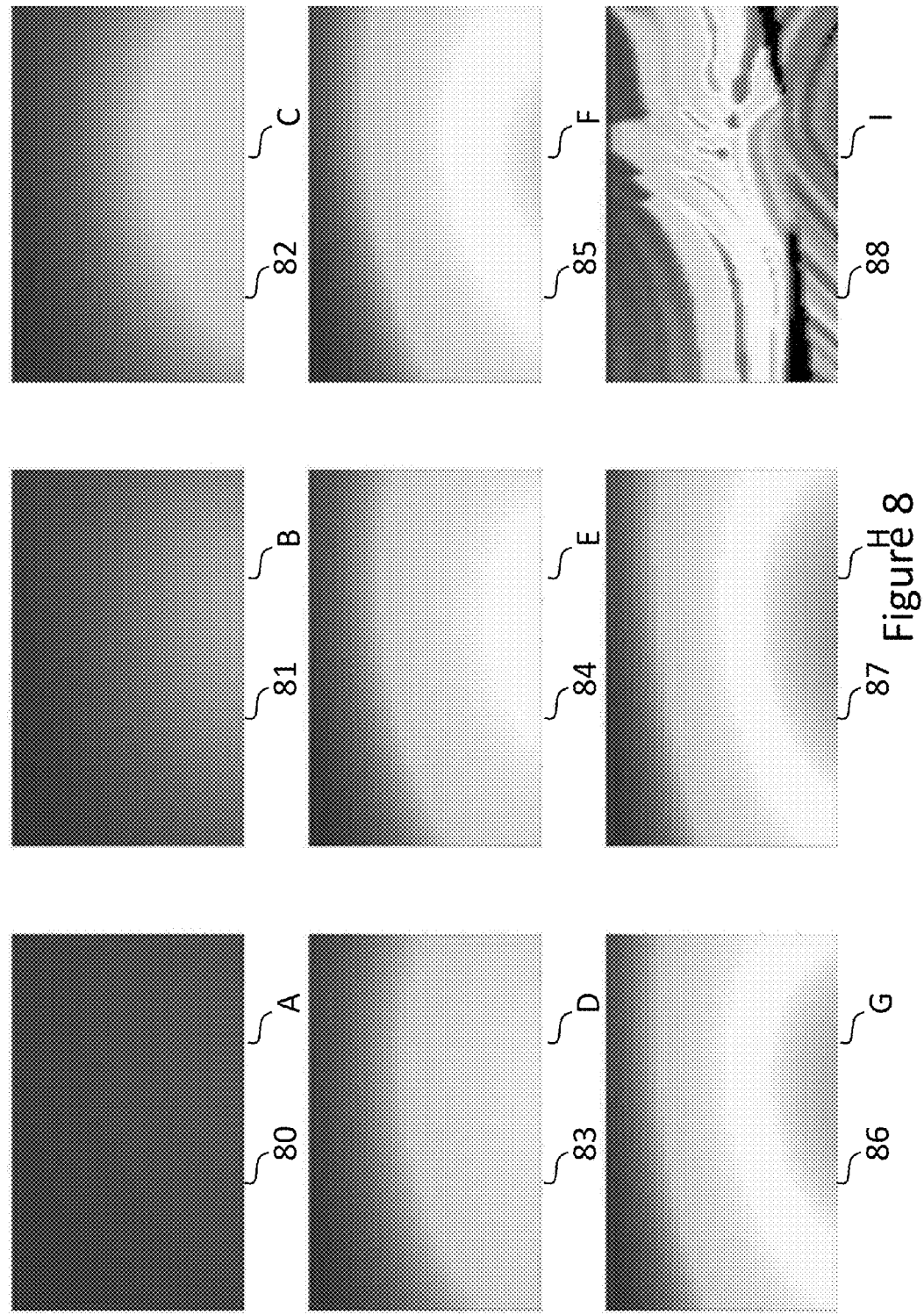
FIGS. 8A-8I illustrate a result of an embodiment of phase-only full waveform inversion.

FIG. 8 shows the result of an embodiment of the present invention, a phase-only full waveform inversion using phase unwrapping with a left preconditioner, continuation approach, and solving the successive linear problems. Panel 80 is the initial model, which is a constant 1500 m/s (water velocity). This is the same initial model that was shown in FIG. 4 panel 40. Panel 88 in FIG. 8 shows the true velocity model. Panels 81-87 show successive nonlinear iterations at 1 Hz, beginning from the initial model. Panel 81 shows that, after one iteration, accurate long spatial wavelengths are present in the inverted model and they are refined as the iterations progress through panels 82-87. Seven nonlinear iterations allow the recovery of the missing long spatial wavelengths of velocity not possible using the conventional approach, as seen in FIG. 4.

Figure 9:
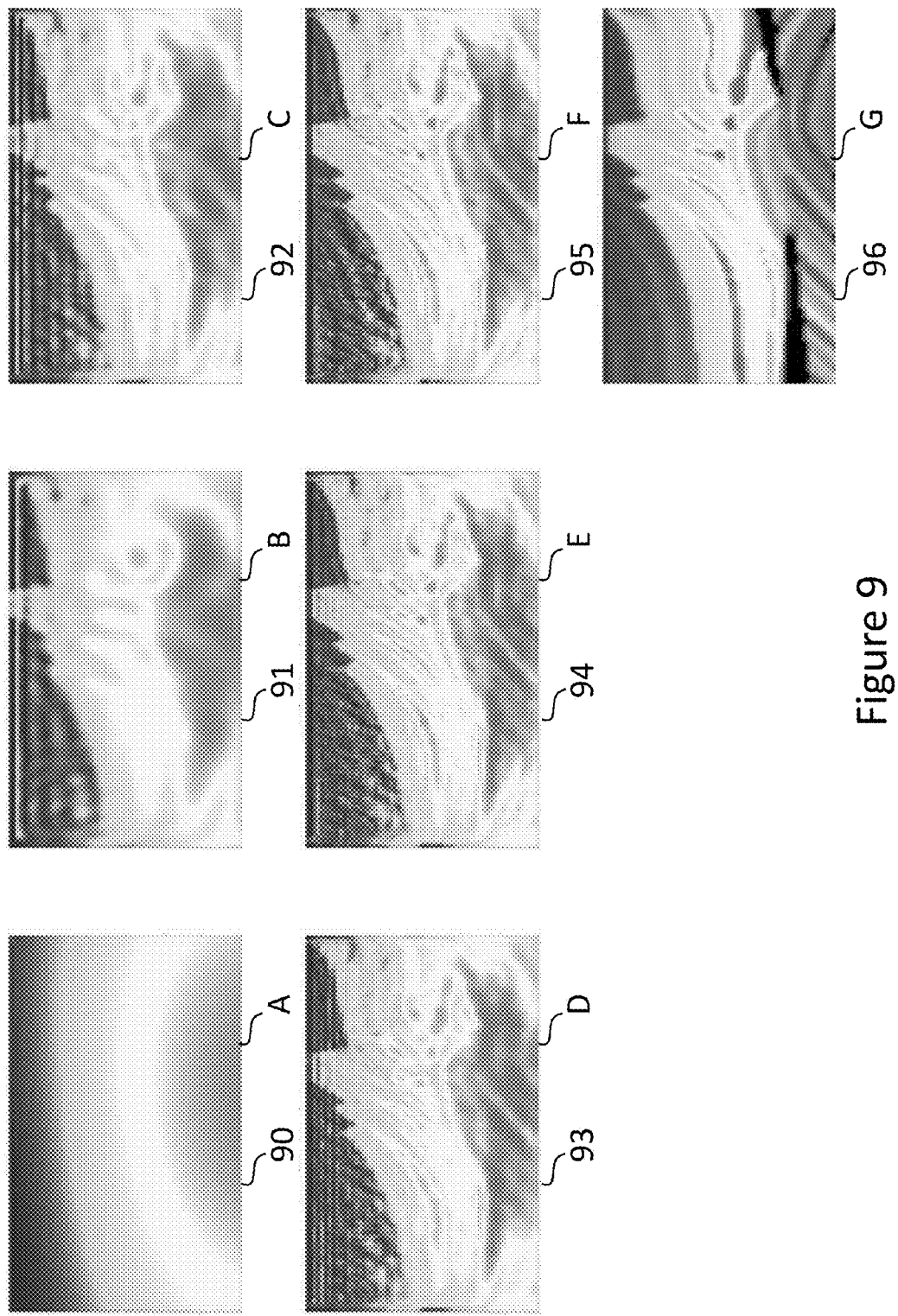
FIGS. 9A-9G illustrate a result of another embodiment of phase-only full waveform inversion followed by conventional full waveform inversion.

In another embodiment of the present invention, the model generated by the phase-only full waveform inversion may be used as an initial model for conventional full waveform inversion. This is demonstrated in FIG. 9, where the initial model for the conventional full waveform inversion in panel 90 is the model generated by 7 iterations of phase-only full waveform inversion in FIG. 8, panel 87. Performing 5 iterations of conventional full waveform inversion (panels 91-95) at 2.5 Hz results in an inverted model (panel 95) that is very comparable to the true velocity model in panel 96.

Figure 10:
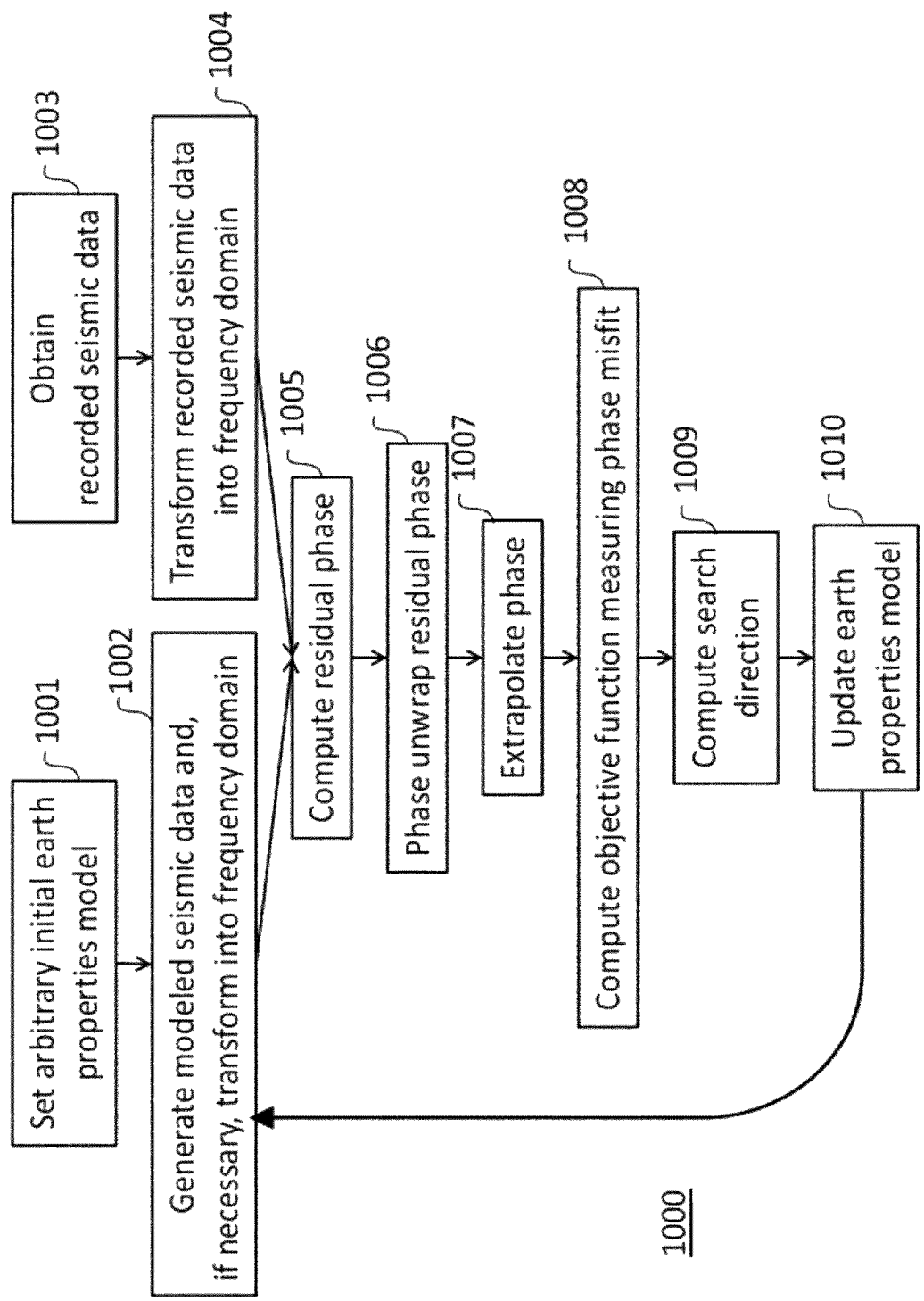
FIG. 10 is a flow chart illustrating another embodiment of the present invention using phase extrapolation.

FIG. 10 illustrates yet another embodiment of the present invention. In this embodiment, the phase-only full waveform inversion flow is shown as method 1000. The steps are the same as those of method 500 in FIG. 5 with the addition of step 1007, phase extrapolation, after the phase unwrapping step 1006. Steps 1001, 1002, 1003, 1004, 1005, 1006, 1008, 1009, and 1010 are performed in the same manner as steps 50, 51, 52, 53, 54, 55, 56, 57, and 58, respectively. Step 1007 is a phase extrapolation step which may be used to extrapolate the unwrapped phase to lower frequencies than exist in the recorded seismic data. This very low frequency phase information can then be used in steps 1008, 1009, and 1010 to aid the recovery of the very long spatial wavelengths that make up the velocity model.

The present method of phase extrapolation uses the relationship between linear phase shift and traveltime:

$$\phi_{f_1} = 2\pi f_1 t \qquad \text{Eqn. 19}$$

where $\phi_{f_1}$ is the phase at frequency $f_1$ and t is the traveltime. To extrapolate the phase to another frequency $f_2$ and assuming that the traveltime does not change, we solve for t and substitute it:

$$t = \frac{\varphi f_1}{2\pi f_1} \qquad \text{Eqn. 20}$$

$$\varphi f_2 = 2\pi f_2 t = \varphi f_1 \frac{f_2}{f_1} \qquad \text{Eqn. 21}$$

In this embodiment, the phase is extrapolated to lower frequencies than those observed and conventionally usable. Conventionally usable frequencies are typically greater than 2 Hz. This is done by linearization of the unwrapped phase as a function of frequency and may be applied to the observed phase, the modeled phase, or the residual phase. The extrapolated data is then inverted using some objective function defined to measure phase mismatch. The method is applicable for any case when the phase is linear in frequency.

Figure 11:
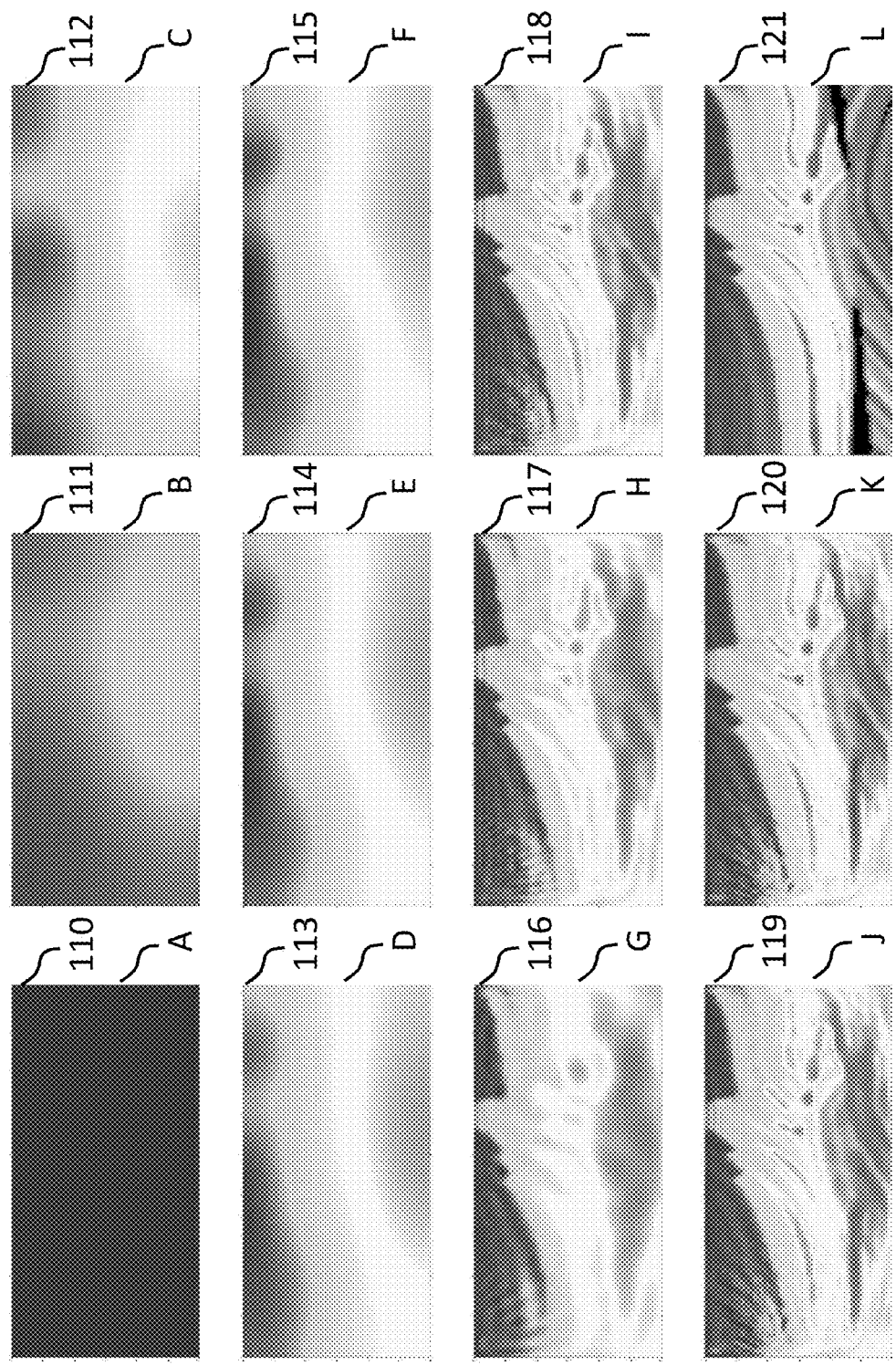
FIGS. 11A-11L illustrate a result of an embodiment using phase extrapolation.

FIG. 11 illustrates the result of one embodiment of a phase extrapolation method. Panel 110 is the initial model, in this case constant water velocity of 1500 m/s and panel 121 is the true velocity model. Panels 111-115 are phase extrapolation inversion from 2.5 Hz to 0.1, 0.2, 0.3, 0.4, and 0.5 Hz, respectively. Panels 116-120 are conventional inversion at frequencies 2.5, 4.5, 6.5, 8.5, and 10.5 Hz continuing from the phase extrapolation result in panel 115.

One skilled in the art will appreciate that there are many other possible uses of phase extrapolated data. By way of example and not limitation, synthetic aperture radar (SAR) data may be obtained, phase unwrapped using a preconditioner, and phase extrapolated prior to SAR imaging methods. Additionally, data that has been phase unwrapped using a preconditioner and phase extrapolated may then be used to evaluate a cost function. One example is the use of unwrapped phase to compute an objective function for stochastic or Bayesian optimization, with the advantage that the cost function would correctly handle cycle-skipped data.

Although the embodiments above have been explained in terms of two dimensional models, the methods are easily extended into three dimensions and multi parameter earth models. The methods for phase unwrapping, phase extrapolation, and phase only full waveform inversion disclosed in the present invention may be extended into multiple dimensions and remain within the scope of the present invention.

Figure 12:
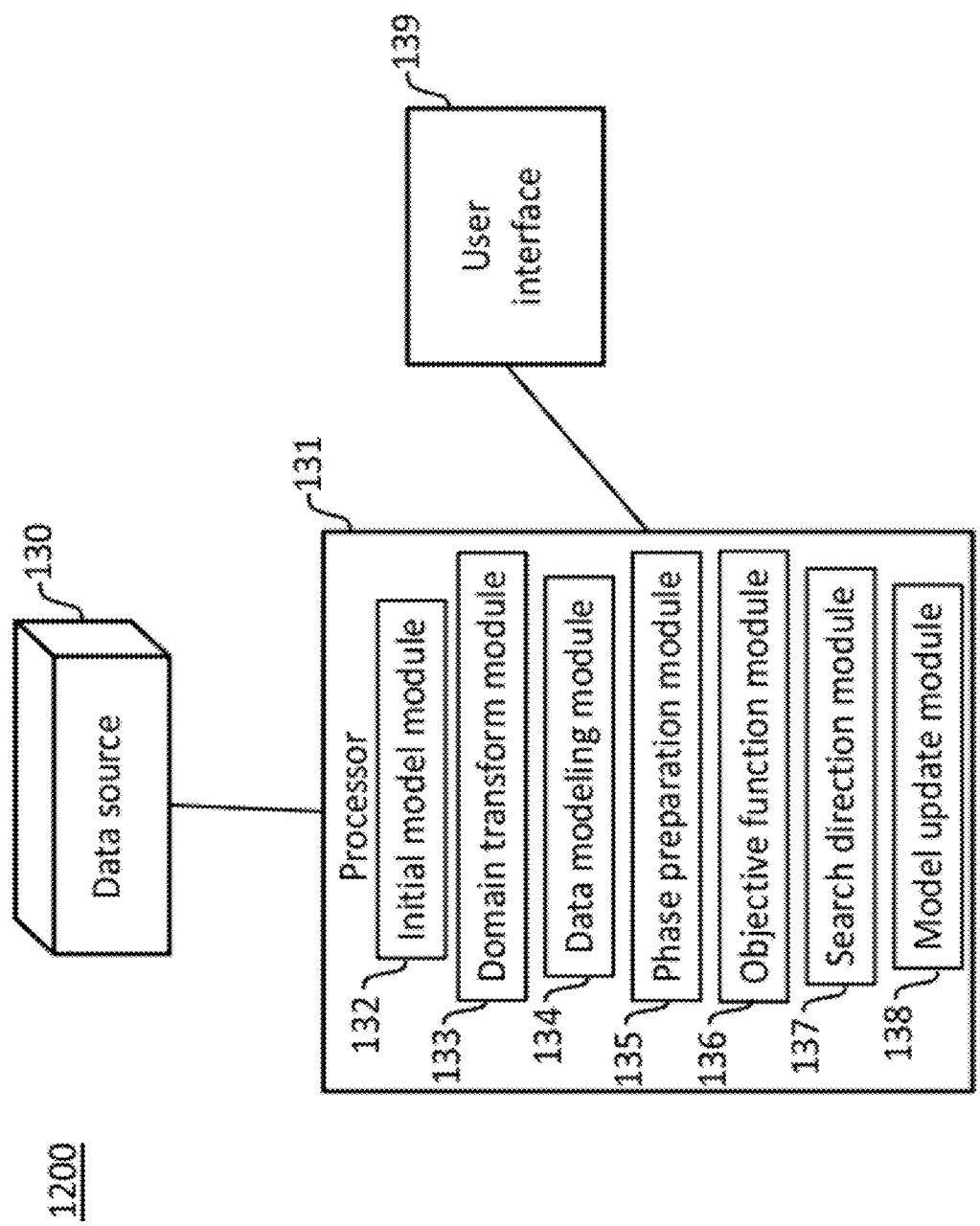
FIG. 12 schematically illustrates a system for performing a method in accordance with an embodiment of the invention.

A system 1200 for performing the method is schematically illustrated in FIG. 12. The system includes a data storage device or memory 130. The data storage device 130 contains recorded data and may contain an initial model. The recorded data may be made available to a processor 131, such as a programmable general purpose computer. The processor 131 is configured to execute an initial model module 132 to create an initial model if necessary or to receive the initial model from the data storage 130. The processor 131 is also configured to execute the domain transform module 133 for transforming recorded and optionally modeled data into the frequency domain, the data modeling module 134 for forward modeling data based on the initial and updated models, the phase preparation module 135 for phase unwrapping with a preconditioner and optionally phase extrapolating the recorded data, the objective function module 136 for computing the objective function that compares the modeled data with the phase unwrapped recorded data, the search direction module 137 for determining the search direction, and the model update module 138 for updating the model. The processor 131 is also configured to execute modules 134, 135, 136, 137, and 138 repeatedly until the result from the objective function module 136 meets user requirements or a maximum number of iterations is reached. The processor 131 may include interface components such as a user interface 139, which may include both a display and user input devices, and is used to implement the above-described transforms in accordance with embodiments of the invention. The user interface may be used both to display data and processed data products and to allow the user to select among options for implementing aspects of the method.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. In addition, it should be appreciated that structural features or method steps shown or described in any one embodiment herein can be used in other embodiments as well.

What is claimed is:

1. A computer-implemented method for determining properties of a subsurface region of interest from actual seismic data comprising:
   a. obtaining actual seismic data representative of the subsurface region and selecting an arbitrary initial earth property model from a data source or generating an arbitrary initial earth property model for the subsurface region;
   b. performing forward modeling, using the arbitrary initial earth property model, to create modeled seismic data with similar acquisition specifications as the actual seismic data;
   c. transforming the modeled and actual seismic data to a temporal Fourier frequency domain to create frequency domain modeled and actual seismic data wherein the frequency domain modeled and actual seismic data includes an amplitude portion and a phase portion;
   d. measuring the misfit between the frequency domain modeled seismic data and frequency domain actual seismic data to produce frequency domain residual seismic data;
   e. performing phase unwrapping of the phase portion of certain observed frequency components of the frequency domain residual seismic data to create an unwrapped residual phase portion; and
   f. inverting the unwrapped residual phase portion to determine desired properties of the subsurface region of interest, wherein the inverting minimizes an objective function defined to measure the misfit, and wherein the performing forward modeling, transforming, measuring, performing phase unwrapping, and inverting steps are performed by a computer processor.

2. The method of claim 1 further comprising extrapolating the unwrapped phase prior to the inverting step.

3. The method of claim 1 further comprising a second inverting step, the second inverting step inverting the amplitude and phase portions of certain observed frequency components of the frequency domain residual seismic data, wherein the second inverting step uses, as a new initial model, the desired properties determined by the inverting the unwrapped residual phase portion.

4. The method of claim 1 wherein the inverting uses a continuation approach to regularize successive iterations.

5. The method of claim 1 wherein the inverting solves a linear inversion problem for each successive linearization.

6. The method of claim 5 wherein the linear inversion problem is solved using a Gauss-Newton method.

7. A system for determining properties of a subsurface region of interest from seismic data comprising:
   a. a data source containing computer-readable data including actual seismic data representative of the subsurface region of interest;
   b. a processor configured to execute computer-readable code from computer modules, the computer modules comprising:
      i. an initial model module configured to select an arbitrary initial property model from the data source or generate the arbitrary initial property model;
      ii. a domain transformation module to transform the actual seismic data into a frequency domain to generate frequency domain seismic data;

iii. a data modeling module to generate modeled seismic data from the arbitrary initial property model or an updated property model;
iv. a residual calculation module to calculate a residual wavefield;
v. a phase preparation module to phase unwrap certain observed frequency components of the frequency domain seismic data;
vi. an inversion module to compute an objective function, a search direction, and update the arbitrary initial property model or a previously updated property model;
c. a user interface.

8. The system of claim 7, wherein the data source also contains the initial property model.

9. The system of claim 7, wherein the processor repeatedly executes the data modeling module, the residual calculation module, the phase preparation module, and the inversion module to minimize the objective function.

10. The system of claim 7 wherein the computer modules further comprise a phase extrapolation module.

11. The system of claim 7 wherein the inversion module performs a phase-only full waveform inversion using a phase-only objective function to generate an updated phase-only inverted property model.

12. The system of claim 11 wherein after the updated phase-only inverted property model is generated, the inversion module performs a conventional full waveform inversion using the updated phase-only inverted property model as the initial property model.

13. The system of claim 7 wherein the inversion module uses a continuation approach to regularize successive iterations.

14. The system of claim 7 wherein the inversion module solves a linear inversion problem for each successive linearization.

15. The system of claim 14 wherein the linear inversion problem is solved using a Gauss-Newton method.

16. An article of manufacture comprising a non-transitory computer readable medium having a computer readable code embodied therein, the computer readable program code adapted to be executed to implement a method for determining properties of a subsurface region of interest from actual seismic data, the method comprising:
a. selecting an arbitrary initial property model from the data source or generating the arbitrary initial property model;
b. performing forward modeling, via a computer, using an arbitrary initial earth property model, to create modeled seismic data with the same or similar acquisition specifications as the actual seismic data;
c. transforming, via a computer, the modeled and the recorded seismic data to a temporal Fourier frequency domain to create frequency domain modeled and frequency domain recorded seismic data wherein the frequency domain modeled seismic data and frequency domain recorded seismic data include an amplitude portion and a phase portion;
d. measuring, via a computer, the misfit between the frequency domain modeled seismic data and frequency domain recorded seismic data to produce frequency domain residual seismic data;
e. performing, via a computer, phase unwrapping of the phase portion of certain observed frequency components of the frequency domain residual seismic data to create an unwrapped residual phase portion;
f. inverting, via a computer, the unwrapped residual phase portion to determine desired properties of the subsurface region of interest, wherein the inverting minimizes an objective function defined to measure the misfit.

* * * * *